US009014746B2

(12) United States Patent
Li

(10) Patent No.: US 9,014,746 B2
(45) Date of Patent: Apr. 21, 2015

(54) CONSERVING THE POWER OF A NODE IN A WIRELESS COMMUNICATION SYSTEM

(75) Inventor: Qingsong Li, Nanjing (CN)

(73) Assignee: Telefonaktiebolaget L M Ericsson (Publ), Stockholm (SE)

(*) Notice: Subject to any disclaimer, the term of this patent is extended or adjusted under 35 U.S.C. 154(b) by 240 days.

(21) Appl. No.: 13/880,100

(22) PCT Filed: Nov. 3, 2010

(86) PCT No.: PCT/CN2010/001757
§ 371 (c)(1),
(2), (4) Date: Apr. 18, 2013

(87) PCT Pub. No.: WO2012/058786
PCT Pub. Date: May 10, 2012

(65) Prior Publication Data
US 2013/0217432 A1    Aug. 22, 2013

(51) Int. Cl.
H04B 7/00        (2006.01)
H04W 52/02      (2009.01)

(52) U.S. Cl.
CPC ...... H04W 52/0203 (2013.01); H04W 52/0248 (2013.01); Y02B 60/50 (2013.01)

(58) Field of Classification Search
USPC ............ 455/522, 67.11, 68–70, 343.1–343.6, 455/127.1, 127.5, 572, 574
See application file for complete search history.

(56) References Cited

U.S. PATENT DOCUMENTS

| 6,584,330 | B1 | 6/2003 | Ruuska |
| 7,739,527 | B2 | 6/2010 | Rothman et al. |
| 8,214,676 | B2* | 7/2012 | Katoh ............................ 713/324 |
| 2001/0005895 | A1* | 6/2001 | Shimura et al. ............... 713/320 |
| 2002/0062454 | A1 | 5/2002 | Fung |
| 2003/0210660 | A1 | 11/2003 | Wiberg et al. |
| 2006/0123422 | A1 | 6/2006 | Felter et al. |

(Continued)

FOREIGN PATENT DOCUMENTS

| CN | 101105711 A | 1/2008 |
| CN | 101616473 A | 12/2009 |

(Continued)

OTHER PUBLICATIONS

International Search Report issued for PCT/CN2010/001757, mailed on Aug. 11, 2011.

(Continued)

Primary Examiner — Dominic E Rego
(74) Attorney, Agent, or Firm — Coats & Bennett, PLLC

(57) ABSTRACT

A method of reducing power consumption of a Radio Network Controller with a plurality of control units in a wireless communication system, each of the control units including one or more processors, the control units being adapted to operate in an active mode or adopt a power saving mode and a first control unit i operating in the active mode, the method comprising the steps of measuring a degree of utilization $C_{wi}$ of the first control unit i, comparing the degree of utilization $C_{wi}$ of the first control unit i with a first threshold $T_{sli}$, and changing the mode of the first control unit i to a power saving mode after a predetermined first period of time if the degree of utilization of the first control unit i is below the first threshold $T_{sli}$.

13 Claims, 6 Drawing Sheets

(56) References Cited

U.S. PATENT DOCUMENTS

| | | |
|---|---|---|
| 2008/0016374 A1 | 1/2008 | Gee et al. |
| 2009/0040672 A1* | 2/2009 | Chishima ........................ 361/63 |
| 2009/0243820 A1* | 10/2009 | Fujiwara et al. ........... 340/426.1 |
| 2009/0285221 A1* | 11/2009 | Ito ............................. 370/395.53 |
| 2010/0079432 A1 | 4/2010 | Kang et al. .................... 345/211 |
| 2010/0144363 A1 | 6/2010 | De Rosa et al. |
| 2010/0174940 A1* | 7/2010 | Kitora ............................... 714/7 |
| 2011/0007681 A1* | 1/2011 | Park et al. ..................... 370/311 |
| 2011/0126036 A1* | 5/2011 | Hayakawa ..................... 713/323 |
| 2011/0183727 A1* | 7/2011 | Kato et al. ..................... 455/574 |
| 2012/0036335 A1* | 2/2012 | van Winkelhoff et al. .... 711/167 |
| 2012/0063317 A1 | 3/2012 | Muraoka et al. |

FOREIGN PATENT DOCUMENTS

| | | |
|---|---|---|
| CN | 101661327 A | 3/2010 |
| CN | 101770273 A | 7/2010 |
| WO | 0207464 A1 | 1/2002 |
| WO | 2005088443 A2 | 9/2005 |
| WO | 2005088443 A3 | 9/2005 |
| WO | 2010110189 A1 | 9/2010 |

OTHER PUBLICATIONS

Hong, C., "A Study on Intelligent Electricity Saving Technology in GSM System", ZTE Technologies, Aug. 25, 2008, pp. 24-25, vol. 10, No. 8, ZTE Corporation, China.

* cited by examiner

CONSERVING THE POWER OF A NODE IN A WIRELESS COMMUNICATION SYSTEM

TECHNICAL FIELD

The present invention relates to Radio Network Controller (RNC), particularly to saving the energy of RNC.

BACKGROUND

Radio Network Controller (RNC), which is used to control the Nodes connected to it such as Node Bs, is a governing element in the Universal Mobile Telecommunications System (UMTS) radio access network (UTRAN). A RNC node is generally designed as cluster architecture in which more than one control unit are arranged to obtain a good scalability.

A conventional RNC system with cluster architecture is schematically shown in FIG. 1. The conventional RNC system 1 comprises work unit cluster 10, a transport unit 120, and an O&M (i.e., operation and maintenance) management unit 130; where the work unit cluster 10 includes an administrating unit 100 and a plurality of control units 110.

The control unit, comprising a Node B handling element to manage the cell and common channels, paging, system information distribution and so on, a UE handling element to handle the radio connection setup, radio bearer setup and packet scheduling, and a resource measurement element to measure for example the CPU/memory utilization degree of the control unit, is employed to control part of the radio network which the RNC system governs; for example, it is used to control the radio resource, mobility, handover and the like.

The administrating unit 100 serving as the load balancer of the RNC work unit cluster distributes the requests from the external devices to the control units to achieve a relative balanced load distribution among those control units. The partition element 101 in the administrating unit 100 is used to partition the Node Bs termination among the control units based on the control unit performance status, thereby makes each control unit maintain a relative equal load for Node B related requests. The distribution element 102 as shown in FIG. 1 is used to distribute newly received requests among the control units. The monitor element 103 is utilized to collect the status information from the resource measurement element of each control unit and transfer the collected information to the partition element 101 and the distribution element 102.

The control unit, which is also known as user plane board(s) or control plane board(s) etc, is generally embodied as electrical circuit board(s), such as printed circuit board, in which each board can include one or more processors. Also, the administrating unit can be one or several electrical circuit boards, which comprise at least one processor. The work unit cluster means a cluster architecture which comprises more than two control units and at least one administrating unit.

The O&M management unit 130 is used as a node manager which provides the administrator with a GUI, and the transport unit 120 implements ATM (i.e. Asynchronous Transfer Mode)/IP (i.e. Internet Protocol) transport functionality for external communication tunnel towards CN and Node B.

The RNC system as above-mentioned is deployed to maintain a peak load status which means be kept running at all time. However, it statically shows that the average radio resource utilization at low traffic time (such as 0:00-8:00 of a day) is ⅕ of that at high traffic time (such as 16:00-24:00 of a day). That is, compared to operate at the high traffic time, the control unit of the RNC system at low traffic time usually waits for the external requests. However, the conventional RNC system still keeps all RNC control units, including those waiting for the external requests, fully running as at the high traffic time.

SUMMARY OF THE INVENTION

According to one aspect of the present invention, there is provided a method of reducing power consumption of a Radio Network Controller with a plurality of control units in a wireless communication system, where each of the control units includes one or more processors, the control units are adapted to operate in an active mode or adopt a power saving mode and a first control unit i operates in the active mode. The method may comprises the steps of measuring a degree of utilization $C_{wi}$ of the first control unit i, comparing the degree of utilization $C_{wi}$ of the first control unit i with a first threshold $T_{sli}$, and changing the mode of the first control unit i to a power saving mode after a predetermined first period of time if the degree of utilization of the first control unit i is below the first threshold $T_{sli}$.

The method may further include freezing the first control unit i for the predetermined first period of time, wherein said first control unit i processes the existing requests on it and any new request to said first control unit i is blocked during the first period of time prior to said step of changing the mode of the first control unit i to the power saving mode.

The plurality of control units may comprise a second control unit j operating in the active mode and a third control unit k in the power saving mode. In this case, the method further includes measuring a degree of utilization $c_{wj}$ of the second control unit j, comparing the degree of utilization $c_{wj}$ of the second control unit j with a second threshold $T_{shj}$, and if the degree of utilization of the second control unit j is above the second threshold $T_{shj}$ then changing the mode of the third control unit k to the active mode.

According to the method, measuring the degree of utilization $c_{wj}$ of the second control unit j may include measuring the degree of utilization of each processor of the second control unit j, and determining the degree of utilization $C_{wj}$ of the second control unit j based upon the measured degree of utilization of each processor of the second control unit j.

According to the method, changing the mode of the first control unit i to a power saving mode may comprise adding the first control unit i to a list of control units in the power saving mode.

According to the method, measuring a degree of utilization $C_{wi}$ of the first control unit i may comprises measuring the degree of utilization of each processor of the first control unit i, and determining the degree of utilization $C_{wi}$ of the first control unit i based upon the measured degree of utilization.

According to the method, all of the control units in the list of control units in the power saving mode are activated and enter to the active mode after a predetermined second period of time.

According to another aspect of the present invention, there is provided a Radio Network Controller (RNC) with a plurality of control units in a wireless communication system, each of the control units including one or more processors, the control units being adapted to operate in an active mode or adopt a power saving mode and a first control unit i operating in the active mode. The Radio Network Controller includes a measurement module adapted to measure a degree of utilization $C_{wi}$ of the first control unit i, and a power saving process module connected to the measurement module, where the power saving process module is adapted to compare the degree of utilization $C_{wi}$ of the control unit i with a first threshold $T_{sli}$, and change the mode of operation of the first control unit i to a power saving mode after a predetermined first period of time if the degree of utilization $C_{wi}$ of the control unit i is below the first threshold $T_{sli}$.

The power saving process module may be adapted to freeze the first control unit i for the predetermined first period of time prior to changing the mode of the first control unit i to the power saving mode, wherein said control unit i processes the existing requests on it and any new request to said first control unit i is blocked during the predetermined first period of time.

The plurality of control units may comprise a second control unit j operating in the active mode and a third control unit k in the power saving mode. The power saving process module may be adapted to measure a degree of utilization $C_{wj}$ of the second control unit j, compare the degree of utilization $C_{wj}$ of the second control unit j with a second utilization threshold $T_{shj}$, and change the mode of operation of the third control unit k to the active mode if the degree of utilization $C_{wj}$ of the second control unit j is above the second threshold $T_{shj}$.

The measurement module may be adapted to measure the degree of utilization of each processor of the second control unit j, and determine the degree of utilization $C_{wj}$ of the second control unit j based upon the measured degree of utilization of each processor of the second control unit j.

The power saving process module may be adapted to add the first control unit i to a list of control units in the power saving mode if the degree of utilization of the first control unit i is below the first threshold $T_{sli}$.

The measurement module may include a measurement sub-module adapted to measure the degree of utilization of each processor of the control unit i; and a computing sub-module adapted to determine the degree of utilization $C_{wi}$ of the first control unit i based upon the measured degree of utilization of each processor of the first control unit i.

Further, the measurement sub-module adapted to measure the degree of utilization of each processor of the second control unit j; and a computing sub-module adapted to determine the degree of utilization $C_{wj}$ of the second control unit j based upon the measured degree of utilization of each processor of the second control unit j. The measurement sub-module is substantially adapted to measure the degree of utilization of each processor of any control unit, such as control unit i, j, and k, not intended to merely measure control unit i or j.

The power saving process module may be adapted to change the mode of operation of each of the control units on the list of control units in the power saving mode to the active mode after a predetermined second period of time.

DETAILED DESCRIPTION

Before the present invention is described, it is to be understood that this invention is not limited to particular embodiment described, as such may, of course, vary. It is also to be understood that the term used herein is for the purpose of describing particular embodiment only, and is not intended to be limiting, since the scope of the present invention will be limited by the appended claims.

Figure 1:
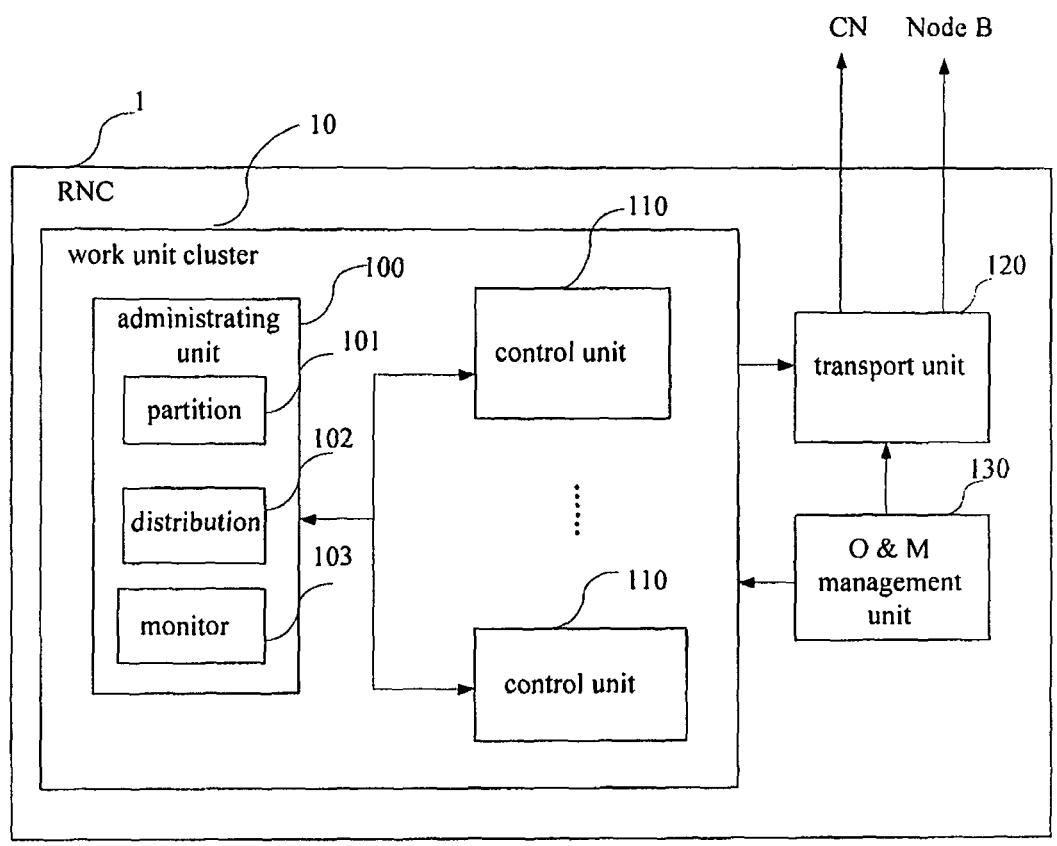
FIG. 1 is a block diagram illustrating the existing Radio Network Controller.
Figure 2:
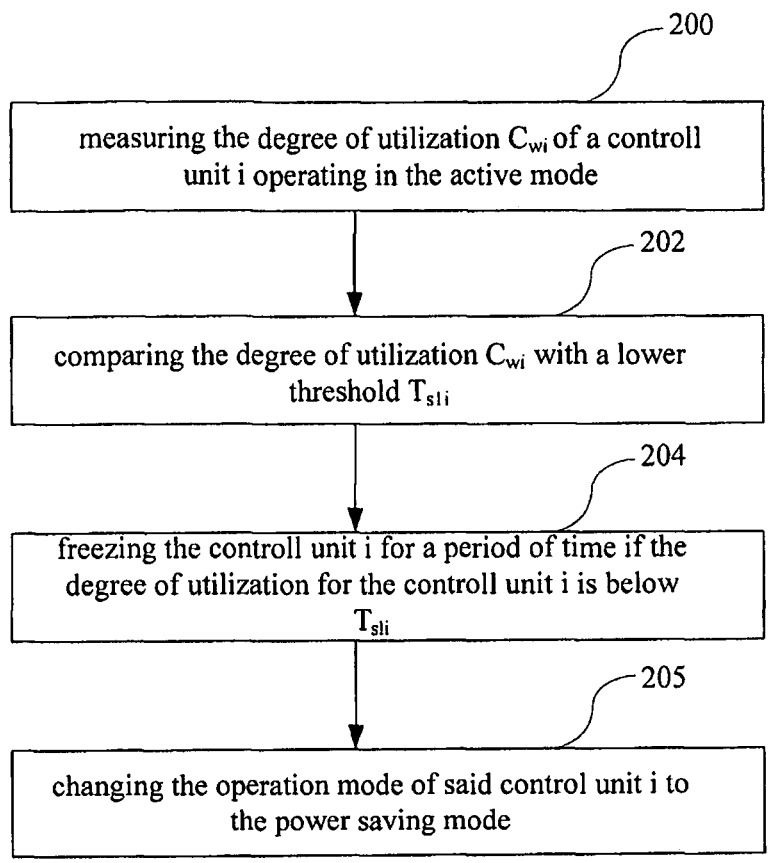
FIG. 2 is a flow diagram of the method according to an embodiment of the present invention.

FIG. 2 is a flow diagram of the method according to an embodiment of the present invention. The method shown in FIG. 2 can be applied to a RNC system which comprises a plurality of control units. With reference to FIG. 2, the degree of utilization $C_{wi}$ of the first control unit i, which operates in the active mode, is measured at step 200, in which the degree of utilization $C_{wi}$ of the first control unit i may be the utilization degree of the each processor of the first control unit i. Then at step 202, the measured degree of the utilization $C_{wi}$ is compared with a first threshold $T_{sli}$ which is pre-determined. In the case that the degree of utilization of the first control unit i is below the first threshold $T_{sli}$ (step 204), the first control unit i is changed (step 205) to operate in a power saving mode after a predetermined first period of time, or the control unit i adopts the power saving mode to operate. During the predetermined first period of time, the first control unit i handles the existing requests on it and blocks the new request. As an example, the first control unit i enters to the power saving mode after the first period of time, in which the control unit for example consumes lower power than operating in the active mode. It should be noted that the term "existing requests" herein refers to those requests which have been distributed to the first control unit i. However, as an alternative, the term "existing requests" herein can only refer to those requests being handled by the first control unit i when freezing the first control unit i, in this case, the requests that have been distributed to the first control unit but not be handled can be re-assigned to another control unit for example by an administrating unit in the RNC system.

The term "active mode" herein represents a state that a control unit can handle the requests from external devices, as one skilled in the art commonly understands. The term "power saving mode" herein means a state that the control unit is not able to handle any request. In the context of the present disclosure, the term "power saving mode" can be shutdown or sleep state.

In the disclosure below, the lower utilization threshold represents the first threshold, and the upper utilization threshold represents the second threshold.

Figure 3:
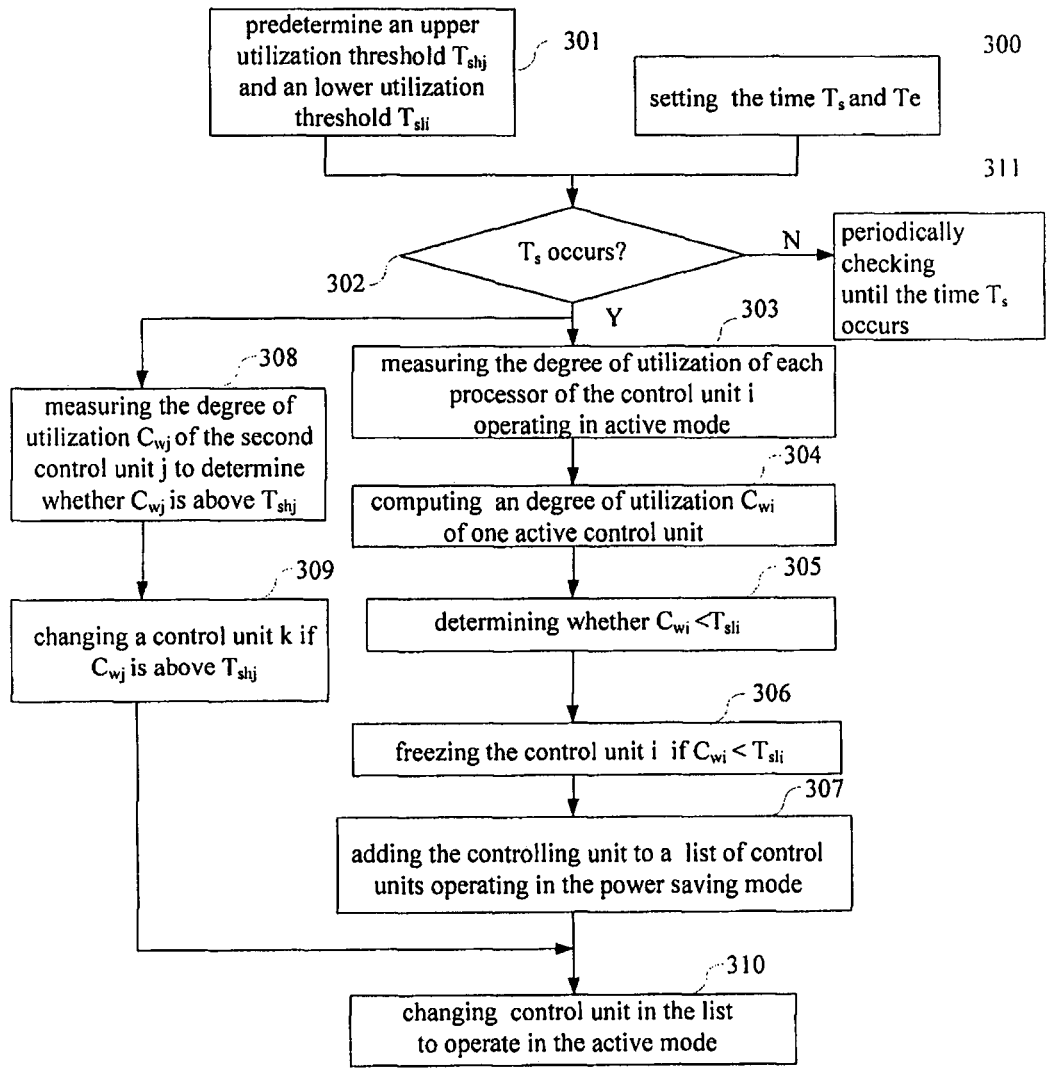
FIG. 3 is a flow diagram illustrating the details of the method shown in FIG. 2.

FIG. 3 is a flow diagram illustrating the details of the method shown in FIG. 2. As an example, an upper utilization threshold $T_{shj}$ and the lower utilization threshold $T_{sli}$ can be predetermined (step 301). A second period of time is further predetermined (300), where the second period of time for example can be a time window starting at a time $T_s$ and ending at another time $T_e$. At step 302, the current RNC time is checked to determine whether the current RNC time is $T_s$ or whether the current RNC time is between $T_s$ and $T_e$. If the current RNC time is $T_s$ or between $T_s$ and $T_e$, then the degree of the utilization of each processor of the control unit i, which is operating in active mode, is measured at step 303. Otherwise the current RNC time is periodically checked until $T_s$ occurs or the current RNC time is between $T_s$ and $T_e$ at step 311 and when the time $T_s$ occurs or the current RNC time is between $T_s$ and $T_e$, the step of 303 is executed.

Still with reference to FIG. 3, at step 304, the utilization degree $C_{wi}$ of the control unit i is computed from the measured utilization of each processor at step 303. Further, the computed utilization degree $C_{wi}$ is compared with the predetermined lower threshold $T_{sli}$ to determine whether the $C_{wi}$ is less the $T_{sli}$ at step 305. The control unit i is frozen (step 306) if the $C_{wi}$ is below the lower utilization threshold $T_{sli}$; otherwise turn back to step 303. Then at step 307, the control unit i is added to a list of control units in the power saving mode and enters to the power saving mode in which no request should be distributed to it. Alternatively, the control unit i can be changed to the power saving mode from the active mode upon the compared result at step 305.

If the time $T_s$ occurs or the current RNC time is between the time $T_s$ and $T_e$ at step 302, then at step 308, the degree utilization $C_{wj}$ of the second control unit j is measured to determine whether $C_{wj}$ is above the predetermined upper utilization threshold $T_{shj}$. If the measured $C_{wj}$ is above $T_{shj}$, a third control unit k listed in the list of control units in the power saving mode is then changed to be in the active mode, i.e., the third control unit k is for example activated and to be operate in the active mode, and then is removed from said list at step 309. In this case, the requests from the external devices can be distributed to the control unit k again. Optionally the latest control unit added to the list can be firstly changed, i.e., the control units listed in the list can be activated in order of their recorded time. Note that the degree utilization $C_{wj}$ of the second control unit j is derived from the degree of the utilization of its each processor.

Further, at step 310, all of the control units listed in the list of control unit in the power saving mode is converted (step 310) to operate in the active mode when the time $T_e$ occurs.

According to an exemplary embodiment, the degree utilization of $C_{wi}$ and $C_{wj}$ can be calculated upon $$C_w = \frac{1}{N-2}\left(\sum_{i=1}^{N} C_i - \min(C_1, \ldots, C_n) - \max(C_1, \ldots, C_n)\right), \quad \text{①}$$

where $C_w$ is the degree of the utilization of each control unit, N is the times of processor (for example CPU) sampling operations to each control unit at a requirement measurement period, and $C_i$ is average value of processor utilization values from all processors in each control unit.

As an example, assuming that the requirement measurement period for measuring the control unit is 1 minute and the processor utilization sampling interval is 5 seconds, then 12 times sampling operations are done in 1 minutes. The $C_w$ would be the average value of all sample values except the minimal and maximal one.

Figure 4:
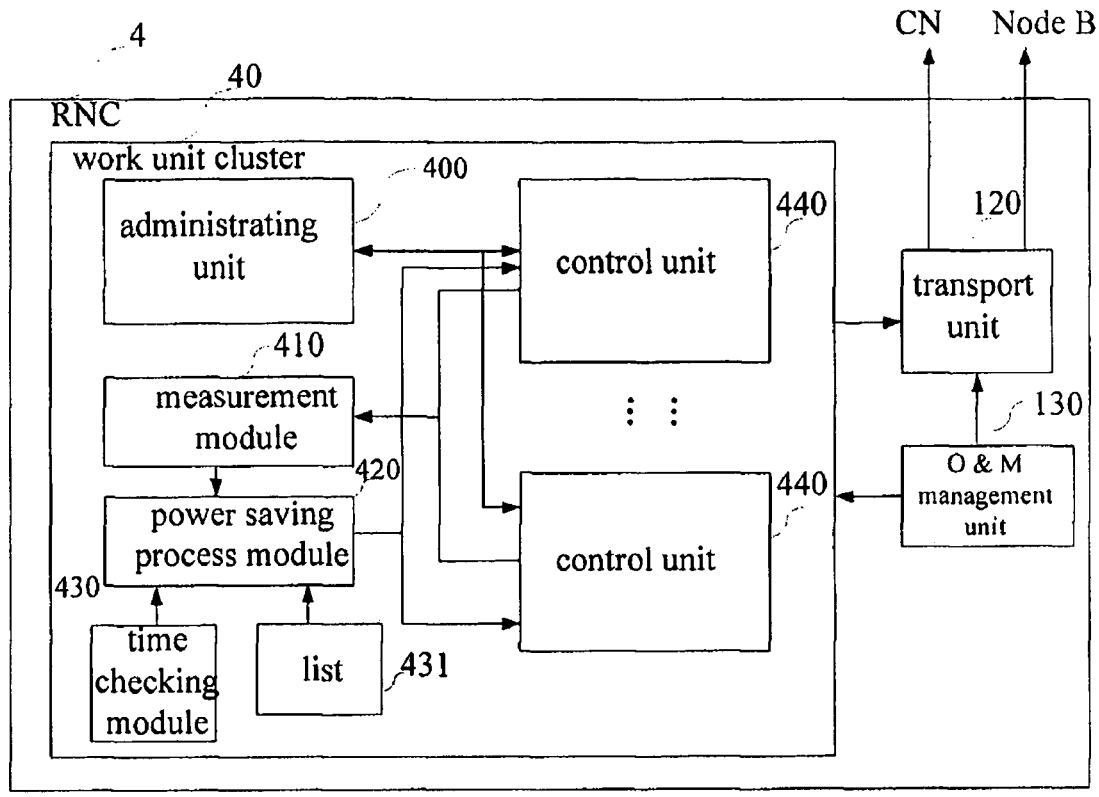
FIG. 4 is a block diagram of the Radio Network Controller according to one exemplary embodiment of the present invention.

It should be understood that "i", "j", and "k" herein are only used to denotes a control unit at different status, rather than to limit the control units to three groups. FIG. 4 is a block diagram of the Radio Network Controller according to one exemplary embodiment of the present invention. The RNC system 4 comprises the work unit cluster 40, the transport unit 120 and O&M unit 130, where the O&M management unit 130 is used as a node manager which provides the operator with a GUI and the transport unit 120 implements ATM/IP transport functionality for external communication tunnel towards CN and Node B.

The work unit cluster 40 of the RNC system 4 further comprises an administrating unit 400, a plurality of control units 440, a measurement module 410 which is adapted to measure a degree of the utilization $C_{wi}$ of the first control unit i in one or more of the control unit 440, and a power saving process module 420 communicatively connected to the measurement module 410. The power saving process module 420 is adapted to compare the degree of utilization $C_{wi}$ of the control unit i with a first threshold $T_{sli}$, and change the mode of operation of the first control unit i to a power saving mode after a predetermined first period of time, if the degree of utilization $C_{wi}$ of the control unit i is below the first threshold $T_{sli}$. As a core component of RNC system, the control units 440 in the work unit cluster 40 are used to handle all of requests from the external devices, and the administrating unit 400 is used to distribute the load among the control units 440.

As an example, the control unit and the administrating unit can be embodied as one or more circuit boards, such as the printed circuit board, with one or more processors. The number of the administrating unit and the control unit can be changed, depending on the requirements of the RNC system.

With reference to FIGS. 3 and 4, an upper utilization threshold $T_{shj}$ and the lower utilization $T_{sli}$ can be predetermined via an interface (not shown) by the operator. Further, a second period of time, which can be for example a time window starting at the time $T_s$ of a day and ending at the time $T_e$, is configured during which enabling some of the control units 440 in some condition to be in the power saving mode. The time checking module 430 checks the current RNC time to determine whether the time $T_s$ occurs or the current RNC time is between $T_s$ and $T_e$. Once the current RNC time is $T_s$ or between $T_s$ and $T_e$, the time checking module 430 sends a signal to the measurement module 410. Upon said signal, the measurement module 410 starts to measure the degree of the utilization of each processor of the control unit i, which is operating in the active mode. The time checking module 430 periodically checks the current RNC time until $T_s$ occurs.

Figure 5:
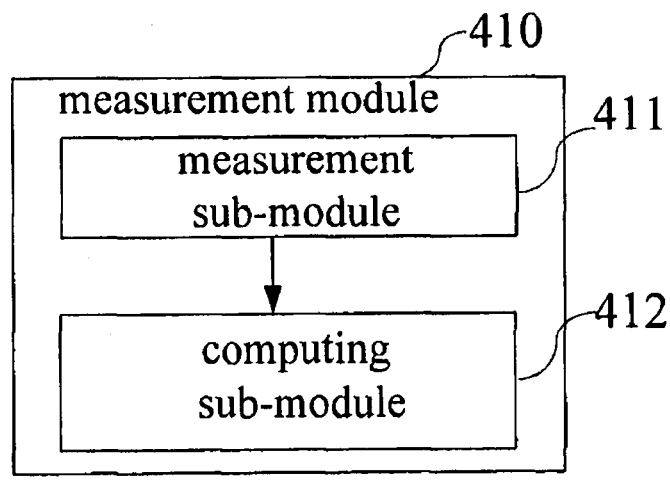
FIG. 5 is a block diagram of the measurement module shown in FIG. 4.

The measurement module 410 determines the utilization degree $C_{wi}$ of the control unit i based on the measurement of the degree of utilization of each processor of the control unit i. As an example, the measurement module, as shown in FIG. 5, can further includes a measurement sub-module 411 used to measure the degree of utilization of each processor of the control unit i, and a computing sub-module 412 to compute the utilization degree $C_{wi}$ of the control unit i upon the measured utilization of each processor according to the equation ①.

The determined utilization degree $C_{wi}$ of the control unit i is then sent to the power saving process module 420.

The power saving process module 420 compares the received utilization degree $C_{wi}$ with the predetermined lower threshold $T_{sli}$, and freezes the control unit i for a predetermined first period of time, such as 90 seconds, in the case that the utilization $C_{wi}$ is below $T_{sli}$. After the predetermined first period of time, the control unit i enters into power saving mode, or the control unit i adopts the power saving mode to operate. Further, the control unit i is added to a list of control units in the power saving mode. During the predetermined first period of time, the first control unit i handles the existing requests on it and the administrating unit 400 will not distribute any request to the first control unit i until it enters to the active mode again. It should be noted that the term "existing requests" herein refers to those requests which have been distributed to the first control unit i. However, as an alternative, the term "existing requests" herein can only refer to those requests being handled by the first control unit i when freezing the first control unit i, in this case, the requests that have been distributed to the first control unit but not be handled can be re-assigned to another control unit.

Moreover, in the case that the time $T_s$ occurs or the current RNC time is between $T_s$ and $T_e$, the time checking module 430 sends a signal to the measurement module 410 to measure the degree utilization $C_{wj}$ of the second control unit j. The power saving process module 420 determines whether the degree utilization $C_{wj}$ of the second control unit j, which is measured by measurement module 410, is above the predetermined upper utilization threshold $T_{shj}$. If $C_{wj}$ is above $T_{shj}$, the power saving process module 420 release a third control unit k recorded in the list of control units in the power saving mode, such that the third control unit k is converted from the power saving mode into the active mode. Also, the control unit k is removed from said list. Optionally, the latest control unit added to the list can be selected to operate in the active mode from the power saving mode. Note that the degree utilization $C_{wj}$ of the second control unit j can be determined from the measured each processor of it.

Further, once the time checking module 430 finds that the current RNC time falls out of the time window which starts at the time $T_s$ and ends at the time $T_e$, or the time checking module 430 finds that the time $T_e$ occurs, all of the control units in the list of control unit in the power saving mode are activated by power saving process module 420, thereby operate in the active mode.

According to an exemplary embodiment, the degree utilization of $C_{wi}$ and $C_{wj}$ can be calculated upon the equation ① as above described.

Figure 6:
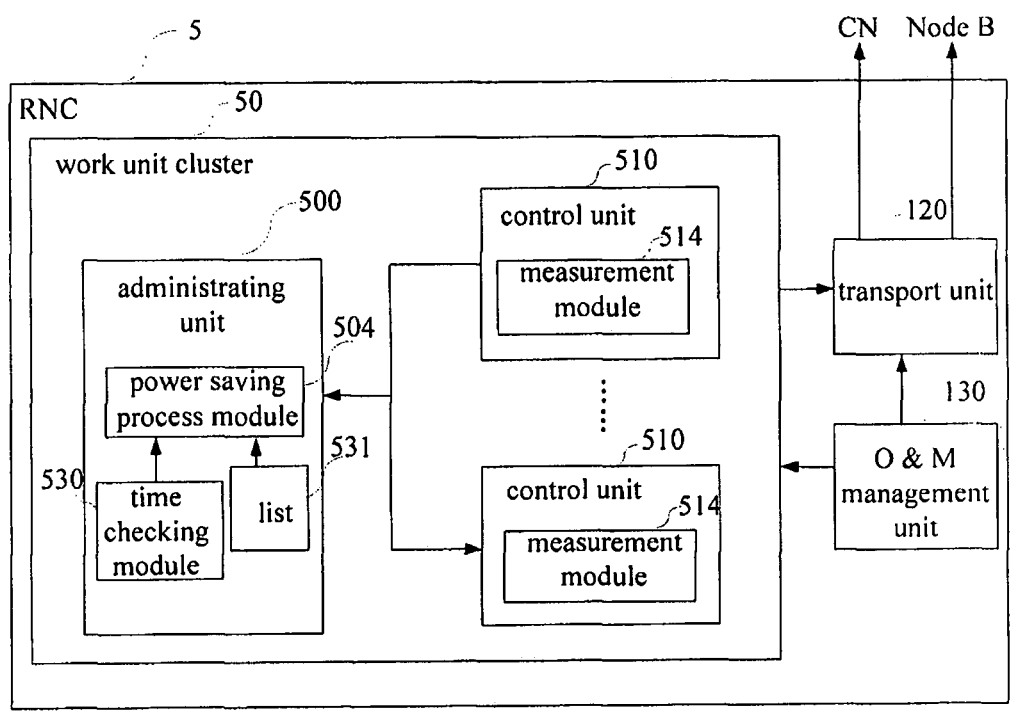
FIG. 6 is a block diagram of the Radio Network Controller according to another exemplary embodiment of the present invention.

FIG. 6 is a block diagram of the Radio Network Controller according to another exemplary embodiment of the present invention. Compared to the RNC system shown in FIG. 4, each control unit 510 in the work unit cluster 50 of the RNC system includes a measurement module 514; and both of the power saving process module 504 and the time checking module 530 are included in the administrating unit 500. The list 531, which is used to record the control unit in the power saving mode, can also be stored in the administrating unit 500.

Figure 7:
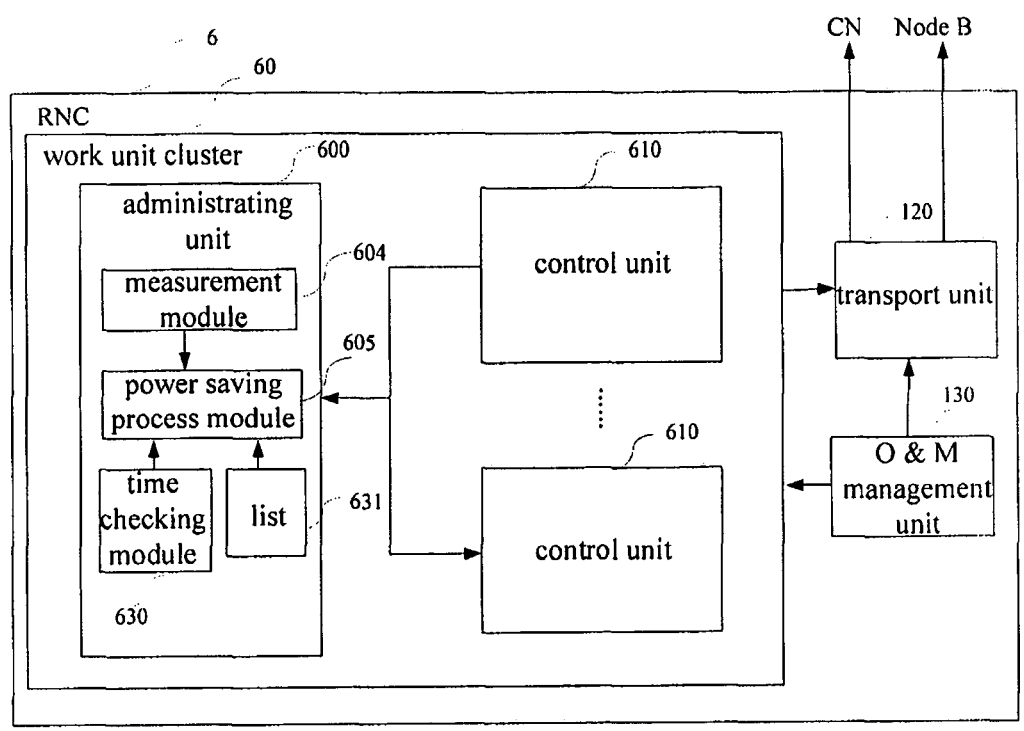
FIG. 7 is a block diagram of the Radio Network Controller according to yet another exemplary embodiment of the present invention.

FIG. 7 is a block diagram of the Radio Network Controller according to yet another exemplary embodiment of the present invention. As an alternative solution, compared to the RNC system shown in FIG. 4, the measurement module 604, the power saving process module 605, the time checking module 630 and the list 631 are integrated in the administrating unit 600 of the work unit cluster 60 in the RNC system 6. The control unit 610 has the same function as the control unit 440 in FIG. 4.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

What is claimed is:

1. A method of reducing power consumption of a Radio Network Controller with a plurality of control units in a wireless communication system, each of the control units including one or more processors, the control units adapted to operate in an active mode or adopt a power saving mode, a first control unit operating in the active mode, the method comprising:
measuring a degree of utilization of the first control unit;
comparing the degree of utilization of the first control unit with a first threshold;
if the degree of utilization of the first control unit is below the first threshold:
freezing the first control unit for a predetermined first period of time, wherein, during the freezing, the first control unit processes the existing requests on it and any new request to the first control unit is blocked; and
changing the mode of the first control unit to a power saving mode after the predetermined first period of time.

2. The method of claim 1:
wherein the plurality of control units comprises a second control unit operating in the active mode and a third control unit in the power saving mode;
wherein the method further comprises:
measuring a degree of utilization of the second control unit;
comparing the degree of utilization of the second control unit with a second threshold;
changing the mode of the third control unit to the active mode if the degree of utilization of the second control unit is above the second threshold.

3. The method of claim 2, wherein the measuring the degree of utilization of the second control unit comprises:
measuring a degree of utilization of each processor of the second control unit;
determining the degree of utilization of the second control unit based on the measured degree of utilization of each processor of the second control unit.

4. The method of claim 1, wherein the changing the mode of the first control unit to a power saving mode after the predetermined first period of time comprises adding the first control unit to a list of control units in the power saving mode.

5. The method of claim 4, further comprising changing the mode of operation of each of the control units on the list of control units in the power saving mode to the active mode after a predetermined second period of time.

6. The method of claim 1, wherein the measuring the degree of utilization of the first control unit comprises:
measuring a degree of utilization of each processor of the first control unit;
determining the degree of utilization of the first control unit based upon the measured degree of utilization of each processor of the first control unit.

7. A Radio Network Controller in a wireless communication system, the Radio Network Controller comprising:
a plurality of control units, each of the control units including one or more processors, the control units adapted to operate in an active mode or adopt a power saving mode, the plurality of control units including a first control unit operating in the active mode;
a measurement module configured to measure a degree of utilization of the first control unit;
a power saving process module communicatively connected to the measurement module and configured to:
compare the degree of utilization of the first control unit with a first threshold; and
if the degree of utilization of the control unit is below the first threshold:
freeze the first control unit for a predetermined first period of time; wherein, during the freezing, the first control unit processes the existing requests on it and any new request to the first control unit is blocked; and
change the mode of operation of the first control unit to a power saving mode after the predetermined first period of time.

8. The Radio Network Controller of claim 7:
wherein the plurality of control units includes a second control unit operating in the active mode and a third control unit k in the power saving mode;
whereon the measurement module is further configured to measure a degree of utilization of the second control unit;
wherein the power saving process module is further configured to:
compare the degree of utilization of the second control unit with a second utilization threshold;
change the mode of operation of the third control unit to the active mode if the degree of utilization of the second control unit is above the second threshold.

9. The Radio Network Controller of claim 8, wherein the measurement module is configured to:
measure a degree of utilization of each processor of the second control unit;
determine the degree of utilization of the second control unit based on the measured degree of utilization of each processor of the second control unit.

10. The Radio Network Controller of claim 9, wherein the measurement module comprises:
a measurement sub-module configured to measure the degree of utilization of each processor of a given control unit;
a computing sub-module configured to determine a degree of utilization of the given control unit based upon the measured degree of utilization of each processor of the given control unit.

11. The Radio Network Controller of claim 10, wherein the given control unit is at least one of the first control unit and the second control unit.

12. The Radio Network Controller of claim 7, wherein the power saving process module is configured to add the first control unit to a list of control units in the power saving mode if the degree of utilization of the first control unit is below the first threshold.

13. The Radio Network Controller of claim 12, wherein the power saving process module is configured to change the mode of operation of each of the control units on the list of control units in the power saving mode to the active mode after a predetermined second period of time.

* * * * *